US006351221B1

(12) United States Patent
Phillips et al.

(10) Patent No.: US 6,351,221 B1
(45) Date of Patent: Feb. 26, 2002

(54) METHOD AND APPARATUS FOR DISTANCE-BASED NOTIFICATION IN A TWO-WAY WIRELESS COMMUNICATION SYSTEM

(75) Inventors: W Garland Phillips, Arlington; Dwight Randall Smith, Grapevine, both of TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/334,006

(22) Filed: Jun. 15, 1999

(51) Int. Cl.[7] .................................................. G08B 5/22
(52) U.S. Cl. .................. 340/825.49; 340/572; 340/539; 379/38
(58) Field of Search ............................ 340/825.49, 572, 340/539, 825.31; 379/38

(56) References Cited

U.S. PATENT DOCUMENTS 5,218,344 A * 6/1993 Ricketts ...................... 340/573
5,872,526 A   2/1999 Tognazzini ................. 340/961
6,151,493 A * 11/2000 Sasakura et al. ............ 455/421

* cited by examiner

Primary Examiner—Michael Horabik
Assistant Examiner—M Shimizu
(74) Attorney, Agent, or Firm—R. Louis Breeden; Charles W. Bethards; Hisashi D. Watanabe

(57) ABSTRACT

A group selected from a plurality of portable subscriber units (122) is defined (402), and a plurality of locations corresponding to members of the group are identified (404) by a controller (112) in cooperation with a base station and the group members. The controller determines (406) from the plurality of locations at least one distance between selected ones of the members, and sends (408) a notification when the at least one distance satisfies a predetermined set of rules.

12 Claims, 3 Drawing Sheets

METHOD AND APPARATUS FOR DISTANCE-BASED NOTIFICATION IN A TWO-WAY WIRELESS COMMUNICATION SYSTEM

FIELD OF THE INVENTION

This invention relates in general to wireless communication systems, and more specifically to a method and apparatus for distance-based notification in a two-way wireless communication system.

BACKGROUND OF THE INVENTION

Location-determining technologies are becoming increasingly important in wireless communication systems. Early applications have concentrated primarily on techniques for improving transmission reliability and frequency reuse. Now, as the location-determining technologies mature, a need for location-driven features is emerging.

More specifically, features associated with groups of portable subscriber units for performing notifications based upon distances between members of the groups have not been exploited. Thus, what is needed is a method and apparatus for distance based notification in a two-way wireless communication system.

SUMMARY OF THE INVENTION

An aspect of the present invention is a method of distance-based notification in a two-way wireless communication system serving a plurality of portable subscriber units which send and receive messages to and from a controller through a base station. The method comprises in the controller the steps of defining a group selected from the plurality of portable subscriber units, and cooperating with the base station and the group to identify a plurality of locations corresponding to members of the group. The method further comprises determining from the plurality of locations at least one distance between selected ones of the members, and sending a notification when the at least one distance satisfies a predetermined set of rules.

Another aspect of the present invention is a controller for distance-based notification in a two-way wireless communication system serving a plurality of portable subscriber units. The controller comprises a processing system for controlling the two-way wireless communication system, and a base station interface coupled to the processing system for communicating with a base station. The processing system is programmed to define a group selected from the plurality of portable subscriber units, and to cooperate with the base station and the group to identify a plurality of locations corresponding to members of the group. The processing system is further programmed to determine from the plurality of locations at least one distance between selected ones of the members, and to send a notification when the at least one distance satisfies a predetermined set of rules.

DETAILED DESCRIPTION OF THE DRAWINGS

Figure 1:
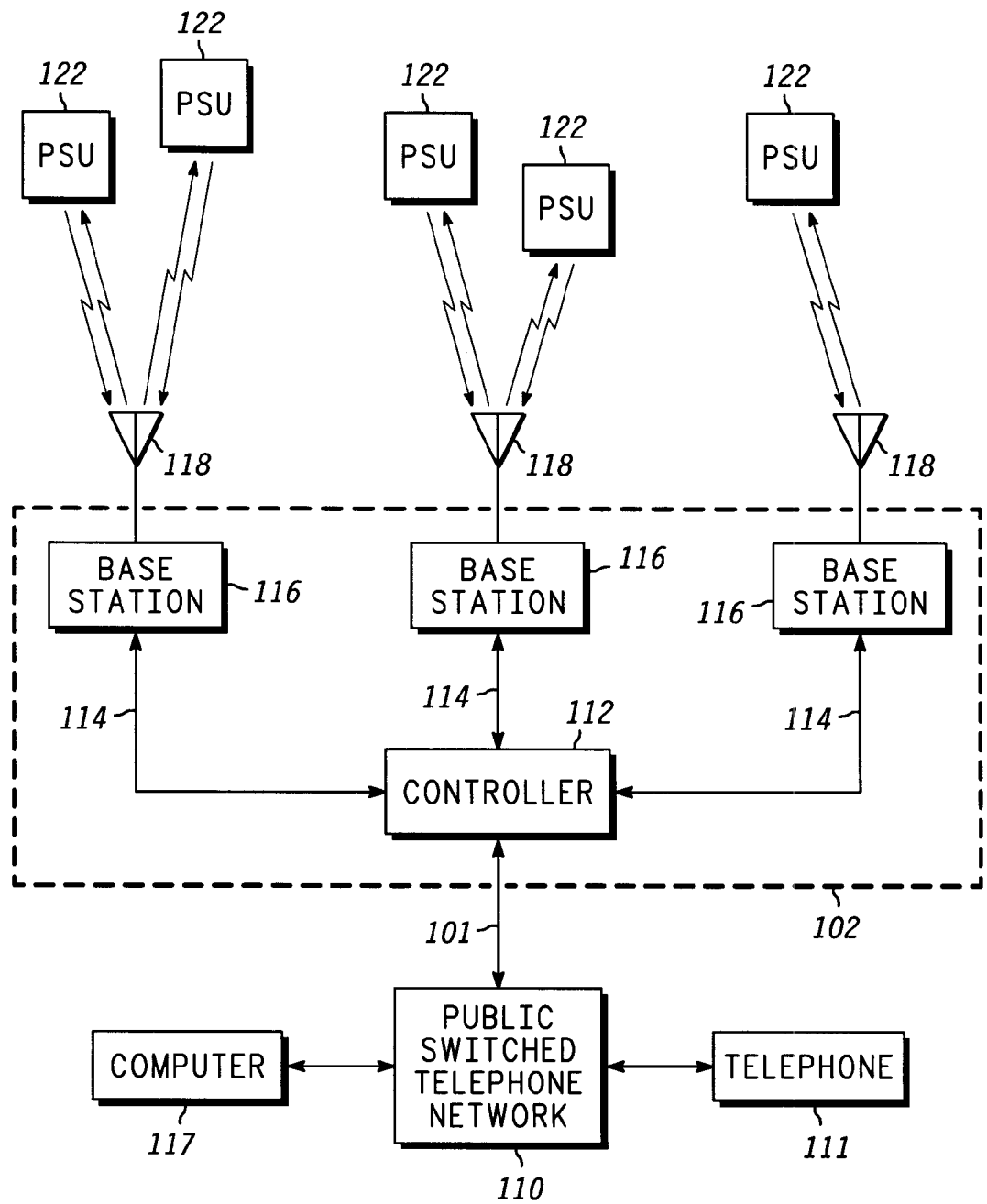
FIG. 1 is an electrical block diagram of an exemplary wireless communication system in accordance with the present invention.

Referring to FIG. 1, an electrical block diagram depicts an exemplary wireless communication system in accordance with the present invention, comprising a fixed portion 102 including a controller 112 and a plurality of conventional base stations 116, the communication system also including a plurality of portable subscriber units 122. The base stations 116 preferably communicate with the portable subscriber units 122 utilizing conventional radio frequency (RF) techniques, and are coupled by conventional communication links 114 to the controller 112, which controls the base stations 116.

The hardware of the controller 112 is preferably a combination of a Choreographer!™ network management device, a Wireless Messaging Gateway (WMG™) Administrator!™ terminal, an RF-Usher!™ multiplexer, and an RF-Conductor!™ message distributor manufactured by Motorola, Inc., and utilizes software modified in accordance with the present invention. The hardware of the base stations 116 is preferably a combination of the RF-Orchestra!™ transmitter and the RF-Audience!™ receiver manufactured by Motorola, Inc. The portable subscriber units 122 are preferably selective call units similar to PageWriter™ 2000 data portable subscriber units, also manufactured by Motorola, Inc., and also utilize software modified in accordance with the present invention. It will be appreciated that other similar hardware can be used as well for the controller 112, the base stations 116, and the portable subscriber units 122.

Each of the base stations 116 transmits RF signals to the portable subscriber units 122 via an antenna 118. The base stations 116 preferably each receive RF signals from the plurality of portable subscriber units 122 via the antenna 118. The RF signals transmitted by the base stations 116 to the portable subscriber units 122 (outbound messages) comprise selective call addresses identifying the portable subscriber units 122, and data messages originated by a message originator, as well as commands originated by the controller 112 for adjusting operating parameters of the radio communication system. The RF signals preferably transmitted by the portable subscriber units 122 to the base stations 116 (inbound messages) comprise responses that include scheduled messages, such as positive acknowledgments (ACKs), requested location reports, and negative acknowledgments (NAKs), and unscheduled messages, such as registration requests, non-requested location reports, and requests for items of information.

The controller 112 preferably is coupled by telephone links 101 to a public switched telephone network (PSTN) 110 for receiving selective call message originations therefrom. Selective call originations comprising data messages from the PSTN 110 can be generated, for example, from a conventional telephone 111 or a conventional computer 117 coupled to the PSTN 110. It will be appreciated that, alternatively, other types of networks, e.g., a local area network (LAN), a wide area network (WAN), and the Internet, to name a few, can be used for receiving selective call originations. It will be further appreciated that the computer 117 can also function as a server for providing various applications utilized by the wireless communication system. In that mode, the computer 117 can be coupled directly to the controller 112 without going through the PSTN. Alternatively, the computer 117 can be the device that performs part or all of the processing of the present invention, and, when that is the case, can be included within the definition of the controller, as applied herein.

The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous. It will be appreciated that other suitable protocols can be used as well. It will be further appreciated that the invention disclosed herein is equally applicable to many, other types of two-way communication systems, e.g., cellular telephone systems, trunked dispatch systems, and aircraft communication systems, to name a few.

Figure 2:
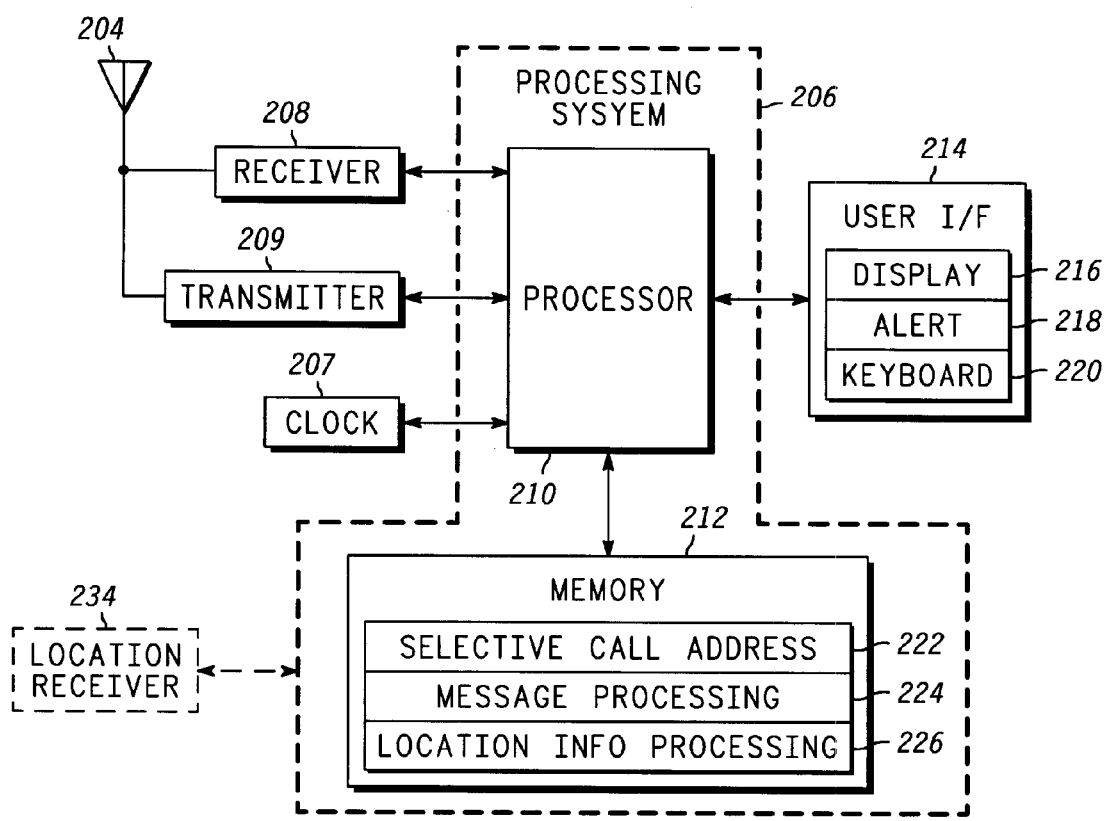
FIG. 2 is an electrical block diagram of an exemplary portable subscriber unit in accordance with the present invention.

FIG. 2 is an electrical block diagram of the exemplary portable subscriber unit 122 in accordance with the present invention. The portable subscriber unit 122 comprises an antenna 204 for intercepting an outbound message and for transmitting an inbound message. The antenna 204 is preferably coupled to a conventional receiver 208 for receiving the outbound message and is coupled to a conventional transmitter 209 for transmitting the inbound message. The receiver 208 and transmitter 209 are coupled to a processing system 206 for processing the outbound and inbound messages and for controlling the portable subscriber unit 122 in accordance with the present invention. A user interface 214 preferably is also coupled to the processing system 206 for interfacing with a user. The user interface 214 comprises a conventional keyboard 220 for requesting that an operation be performed and for controlling the portable subscriber unit 122, a conventional display 216 for displaying a message or notification, and a conventional alert element 218 for alerting the user when an outbound message arrives. A conventional clock 207 is also coupled to the processing system 206 for supporting time keeping requirements of the portable subscriber unit 122.

The processing system 206 comprises a conventional processor 210 and a conventional memory 212. The memory 212 comprises software elements and data for programming the processing system 206 in accordance with the present invention. The memory 212 preferably includes a selective call address 222 to which the portable subscriber unit 122 is responsive. In addition, the memory 212 includes a message processing element 224 for programming the processing system 206 to process messages through well-known techniques. The memory 212 also includes a location information processing program 226 for programming the processing system 206 to cooperate with the controller 112 to process location information in accordance with the present invention. In one embodiment, the location information can comprise a color code uniquely associated with and transmitted by a nearby base station transmitter, using well-known techniques. Zone, sub-zone, and cell identifiers can also be utilized to determine location information. In another embodiment, the portable subscriber unit 122 also includes a conventional location receiver 234, such as a Global Positioning System (GPS) receiver, coupled to the processing system 206 for more accurately determining the location information. It will be appreciated that other location technologies can be deployed, instead or in addition, in the portable subscriber unit 122. Operation of the portable subscriber unit 122 in accordance with the present invention will be described further below.

Figure 3:
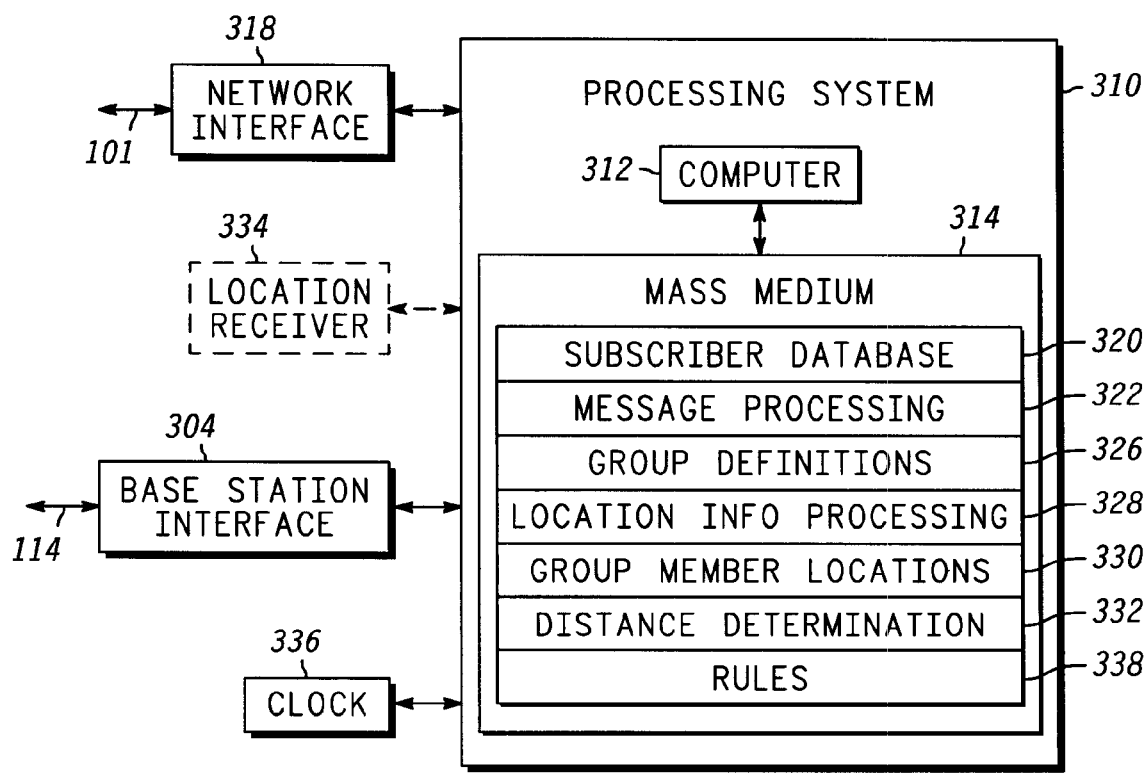
FIG. 3 is an electrical block diagram of an exemplary controller in accordance with the present invention.

FIG. 3 is an electrical block diagram depicting an exemplary controller 112 in accordance with the present invention. The controller 112 comprises a network interface 318 for receiving a message from a message originator via the telephone links 101. The network interface 318 is coupled to a processing system 310 for controlling and communicating with the network interface 318. The processing system is coupled to a base station interface 304 for controlling and communicating with the base stations 116 and thence the portable subscriber units 122, via the communication links 114. The processing system 310 is also coupled to a conventional clock 336 for providing a timing signal to the processing system 310. The processing system 310 comprises a conventional computer 312 and a conventional mass medium 314, e.g., a magnetic disk drive, programmed with information and operating software in accordance with the present invention. The mass medium 314 comprises a conventional subscriber database 320 for storing profiles defining service for subscribers using the system. The mass medium 314 further comprises a message processing program 322 for programming the processing system to process the inbound and outbound messages through well-known techniques.

The mass medium 314 also includes space for group definitions 326, each of which preferably defines a group selected from the plurality of portable subscriber units 122, and a set of distance rules for the group. The group definitions 326 are preferably programmed by a user of the portable subscriber unit 122 through the keyboard 220. It will be appreciated that, alternatively, the group definitions 326 can be programmed by a conventional work station (not shown) coupled to the processing system 310 through well-known techniques. The mass medium 314 further comprises a location information processing program 328 for programming the processing system 310 to cooperate with the base stations 116 and the portable subscriber units 122 of each group to identify a plurality of locations corresponding to members of the group. The mass medium 314 also includes space for storing the group member locations 330 so identified.

The mass medium 314 further comprises a distance determination program for programming the processing system 310 to determine at least one distance between selected ones of the members. The mass medium 314 also preferably includes a set of rules 338 which is associated with each group definition 326 through well-known techniques, for cooperating with the message processing program to program the processing system 310 to send a notification when said at least one distance satisfies the associated set of rules 338. Preferably, the set of rules for a group is defined dynamically through a rule definition language, using well-known techniques. It will be appreciated that, alternatively, the set of rules for a group can be selected from a set of pre-programmed rules. In one embodiment, the controller 112 also includes a conventional location receiver 334, such as a GPS receiver, for helping determine the location information through well-known server-aided GPS techniques. Operation of the controller 112 in accordance with the present invention will be described further below.

Figure 4:
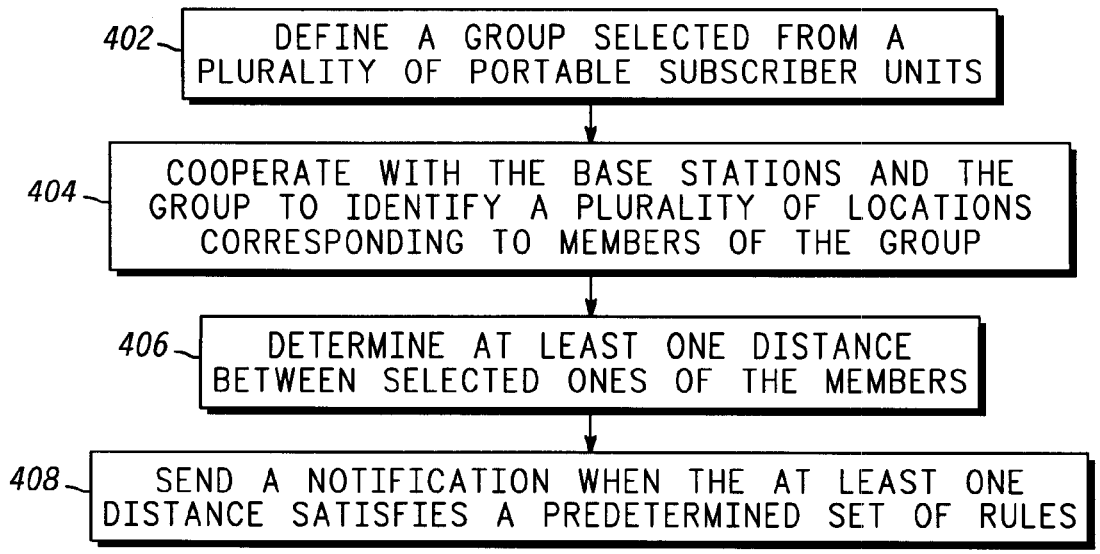
FIG. 4 is a flow diagram depicting operation of the exemplary wireless communication system in accordance with the present invention.

FIG. 4 is a flow diagram depicting operation of the exemplary wireless communication system in accordance with the present invention. The flow begins with the definition 402 of a group selected from the plurality of portable subscriber units 122. Each member of the group is preferably identified by a unique identifier, e.g., a Personal Identification Number (PIN). One of the predetermined sets of rules 338 is also associated with the group members. For example, let a group be defined consisting of two members, A and B. The rule can be: If the distance between A and B becomes less than 30 meters, notify A. This rule could be used by A, for example, to notify A when his boss B is approaching. It will be appreciated that many other variations are possible: If the distance between A and B becomes greater than 1 kilometer, notify both A and B. This could be used, for example, when A and B are traveling in a two-vehicle caravan and do not wish to become separated. Another rule could be: If the distance between A and B is less than 100 meters, notify a third party, C. This could be used, for example, to notify the police when a restraining order is being violated by A, who has been ordered to stay away from B. Additional examples of groups and rules will be described below.

After a group has been defined, the processing system 310 accesses the location information processing program 328 to cooperate 404 with the base stations 116 and the portable subscriber units 122 of the group to identify a plurality of locations corresponding to members of the group. After the members have been located, the locations preferably are recorded in the group member locations 330 section of the mass medium 314. The processing system 310 then accesses the distance determination program 332 to determine 406 at least one distance between selected ones of the members. It will be appreciated that the distance can be determined to an accuracy which is embodiment-dependent. For an embodiment which does not utilize GPS receivers, the location can be determined, for example, by transmitter color code, zone, sub-zone, or cell identifier. For that embodiment, distance can be expressed as same color code, zone, sub-zone, or cell versus different color code, zone, sub-zone, or cell (or, alternatively, nearby color code, zone, sub-zone, or cell versus far away color code, zone, sub-zone, or cell). On the other hand, an embodiment that does utilize GPS receivers in the portable subscriber units 122 can express distance in meters with an accuracy of about 10 meters, through server-assisted GPS technology. It will be appreciated that still other location techniques can be used as well for locating the group members and measuring the distances between them.

The processing system 310 then sends 408 a notification (or a control command) when the at least one distance satisfies the predetermined set of rules associated with the group. It will be appreciated that the notification can be sent to one or more designated members of the group, as well as to a predetermined additional entity, such as a display terminal in a wired or wireless network. The recipient of the notification preferably is specified in the set of rules for the group. It will be further appreciated that the set of rules can become more complex when the size of the group increases. For example, one can define a group consisting of members A, B, and C, selected from the plurality of portable subscriber units 122. The processing system 310 can then determine a first distance between members A and C, and a second distance between members B and C. The processing system 310 then sends a notification to at least one of members A, B, and C in response to satisfying a rule dependent upon said first and second distances. For example, the rule can be: Notify A when the second distance is greater than 20 meters and the first distance is greater than 50 meters. This rule would be useful, for example, when a parent, A, takes a ten-year old child, B, and a six-year old child, C, to an amusement park. The ten-year old can chaperon the six-year old on an amusement ride, but if the children get separated and the parent is also far away from the six-year old, the parent is notified.

A group is preferably not limited to any arbitrary size. One can define a group comprising a plurality of members selected from the plurality of portable subscriber units 122. The processing system 310 then can determine a plurality of distances between the selected ones of the members, and send the notification in response to satisfying a rule dependent upon said plurality of distances. For example, the group can consist of 25 members, and the rule can be: Determine the distances between all combinations of two members; then notify A when any member becomes separated by more than 15 meters from all other members; also identify the separated member. This rule can be used, for example, when A is chaperoning a group of children who are required to stay together.

A variation on the above rule is a rule requiring sending a notification to one of a plurality of members being more than a first predetermined distance from all others of the plurality of members, when said all others of the plurality of members are less than a second predetermined distance from one another. This rule is useful, for example, when one member has forgotten a planned meeting with the other members. When the meeting convenes, the straggler is advantageously notified automatically. A further condition can be placed on the rule. For example, the straggler can specify that the notification should not be sent when his location is that of the office of his boss. More generally, sending the notification can be negated when at least one of the plurality of locations identified for the members of the group satisfies a predetermined set of distance/location rules.

Another variation is to determine a mean center point of the plurality of locations, then to determine a plurality of distances between the mean center point and the plurality of locations, and finally to send the notification when the plurality of distances satisfies a predetermined collection of rules. For example, the rules could require sending the notification to a member that is far from the mean center point when all (or most) other members are near the mean center point, far and near being defined by predetermined distances. One of ordinary skill in the art will recognize that many other sets of rules are possible in accordance with the present invention, limited only by one's imagination and the problems to be solved.

Thus, it should be clear from the preceding disclosure that the present invention advantageously provides a method and apparatus for distance based notification in a two-way wireless communication system. Advantageously, the method and apparatus can handle groups comprising a plurality of members and can generate notifications for group members and other entities, based upon distance relationships between the members satisfying a predetermined set of rules defined for each group.

Many modifications and variations of the present invention are possible in light of the above teachings. Thus, it is to be understood that, within the scope of the appended claims, the invention can be practiced other than as specifically described herein above.

What is claimed is:

1. A method of distance-based notification in a two-way wireless communication system serving a plurality of portable subscriber units which send and receive messages to and from a controller through a base station, the method comprising in the controller the steps of:

defining a group selected from said plurality of portable subscriber units, wherein said defining step comprises the step of defining a group comprising members A, B, and C, selected from said plurality of portable subscriber units;

cooperating with said base station and said group to identify a plurality of locations corresponding to members of said group;

determining from said plurality of locations a plurality of distances between selected ones of said members, wherein said determining step comprises the step of determining a first distance between members A and B, and a second distance between members B and C; and sending a notification when said plurality of distances satisfies a predetermined set of rules concerning said first distance and said second distance of said plurality of distances, wherein said sending step comprises the step of sending said notification to at least one of members A, B, and C in response to satisfying a rule dependent upon said first and second distances.

2. The method of claim 1 wherein said defining step comprises the step of defining a further group of two members selected from said plurality of portable subscriber units, and wherein said determining step comprises the step of determining said first distance as a distance between said two members, and wherein said sending step comprises the step of sending said notification to at least one of said two members in response to at least one of (a) said first distance becoming less than a first predetermined threshold and (b) said first distance becoming greater than a second predetermined threshold.

3. The method of claim 1, wherein said defining step comprises the step of defining a further two members selected from said plurality of portable subscriber units, and wherein said determining step comprises the step of determining said first distance as a distance between said two members, and wherein said sending step comprises the step of sending said notification to an entity different from said two members in response to at least one of (a) said first distance becoming less than a first predetermined threshold and (b) said first distance becoming greater than a second predetermined threshold.

4. The method of claim 1, wherein said sending step comprises the step of sending said notification to one of said plurality of said members being more than a first predetermined distance from all others of said plurality of said members, when said all others of said plurality of said members are less than a second predetermined distance from one another.

5. The method of claim 1, further comprising the step of negating said sending step when at least one of said plurality of locations satisfies a predetermined set of location rules.

6. The method of claim 1, further comprising the steps of:

determining a mean center point of said plurality of locations;

determining a plurality of distances between said mean center point and said plurality of locations; and sending the notification when said plurality of distances satisfies a predetermined collection of rules.

7. A controller for distance-based notification in a two-way wireless communication system serving a plurality of portable subscriber units, the controller comprising:

a processing system for controlling said two-way wireless communication system; and a base station interface coupled to said processing system for communicating with a base station, wherein said processing system is programmed to:

define a group comprising members A, B, and C, selected from said plurality of portable subscriber units;

cooperate with said base station and said group to identify a plurality of locations corresponding to members of said group;

determine from said plurality of locations a plurality of distances between selected ones of said members, said plurality of distances including a first distance between members A and B, and a second distance between members B and C; and send a notification to at least one of members A, B, and C when said plurality of distances satisfies a predetermined set of rules concerning said first distance and said second distance of said plurality of distances.

8. The controller of claim 7, wherein said processing system is further programmed to:

define a further group of two members selected from said plurality of portable subscriber units;

determine said first distance as a distance between said two members; and cooperate with said base station to send said notification to at least one of said two members in response to at least one of (a) said first distance becoming less than a first predetermined threshold and (b) said first distance becoming greater than a second predetermined threshold.

9. The controller of claim 7, wherein said processing system is further programmed to:

define a further two members selected from said plurality of portable subscriber units;

determine said first distance as a distance between said two members; and send said notification to an entity different from said two members in response to at least one of (a) said first distance becoming less than a first predetermined threshold and (b) said second distance becoming greater than a second predetermined threshold.

10. The controller of claim 7, wherein said processing system is further programmed to:

send said notification to one of said plurality of said members being more than a first predetermined distance from all others of said plurality of said members, when said all others of said plurality of said members are less than a second predetermined distance from one another.

11. The controller of claim 7, wherein said processing system is further programmed to:

negate sending said notification when at least one of said plurality of locations satisfies a predetermined set of location rules.

12. The controller of claim 7, wherein said processing system is further programmed to:

determine a mean center point of said plurality of locations;

determine a plurality of distances between said mean center point and said plurality of locations; and send the notification when said plurality of distances satisfies a predetermined collection of rules.

* * * * *